(12) United States Patent
Martinez Ruiz

(10) Patent No.: US 6,450,086 B1
(45) Date of Patent: Sep. 17, 2002

(54) FACILITY FOR PREPARING BAKERY AND PASTRY PRODUCTS

(75) Inventor: Epifanio Martinez Ruiz, Briviesca (ES)

(73) Assignee: Proyecto W21, SL., Santander (ES)

( * ) Notice: Subject to any disclaimer, the term of this patent is extended or adjusted under 35 U.S.C. 154(b) by 0 days.

(21) Appl. No.: 09/926,332

(22) PCT Filed: Apr. 15, 1999

(86) PCT No.: PCT/ES99/00099

§ 371 (c)(1),
(2), (4) Date: Jan. 16, 2002

(87) PCT Pub. No.: WO00/62621

PCT Pub. Date: Oct. 26, 2000

(51) Int. Cl.[7] .............................. A23L 1/00; A21B 1/24; A21B 1/46; A21D 8/00; A21C 11/00
(52) U.S. Cl. ............................ 99/355; 99/352; 99/386; 99/443 C; 99/483
(58) Field of Search .................... 99/352–355, 330, 99/331, 339, 340, 386, 443 C, 443 R, 448, 450, 360, 365, 367, 371, 473–476, 477, 478, 479; 219/388, 400; 126/21 A; 432/142, 152; 426/523

(56) References Cited

U.S. PATENT DOCUMENTS

| | | | | |
|---|---|---|---|---|
| 2,897,772 A | * | 8/1959 | Hunter | 99/352 |
| 2,930,310 A | * | 3/1960 | Poppenburg | 99/479 |
| 3,494,305 A | * | 2/1970 | Pachyn | 99/427 |
| 3,804,583 A | * | 4/1974 | Parkes | 432/230 |
| 4,514,167 A | * | 4/1985 | Royer | 99/443 C |
| 4,882,981 A | * | 11/1989 | Bacigalupe | 99/479 |
| 5,109,758 A | * | 5/1992 | Voegtlin | 99/443 C |

FOREIGN PATENT DOCUMENTS

| | | |
|---|---|---|
| EP | 0 710 441 | 5/1996 |
| ES | 241 758 | 12/1979 |
| ES | 245 787 | 6/1980 |

* cited by examiner

*Primary Examiner*—Timothy F. Simone
(74) *Attorney, Agent, or Firm*—Oblon, Spivak, McClelland, Maier & Neustadt, P.C.

(57) ABSTRACT

A facility for preparing bakery and/or pastry products including a plurality of successive operational stations including at least one preparation station and one baking station, in addition to a conveyor supporting the products and moving the products through the plurality of operational stations. The products baking station includes a hot air oven through which the conveyor is moved along a path having vertical upward and downward branches, each branch in the path being flanked by a mechanism for introducing hot air on one side and by a mechanism for extraction of air on the opposite side.

7 Claims, 7 Drawing Sheets

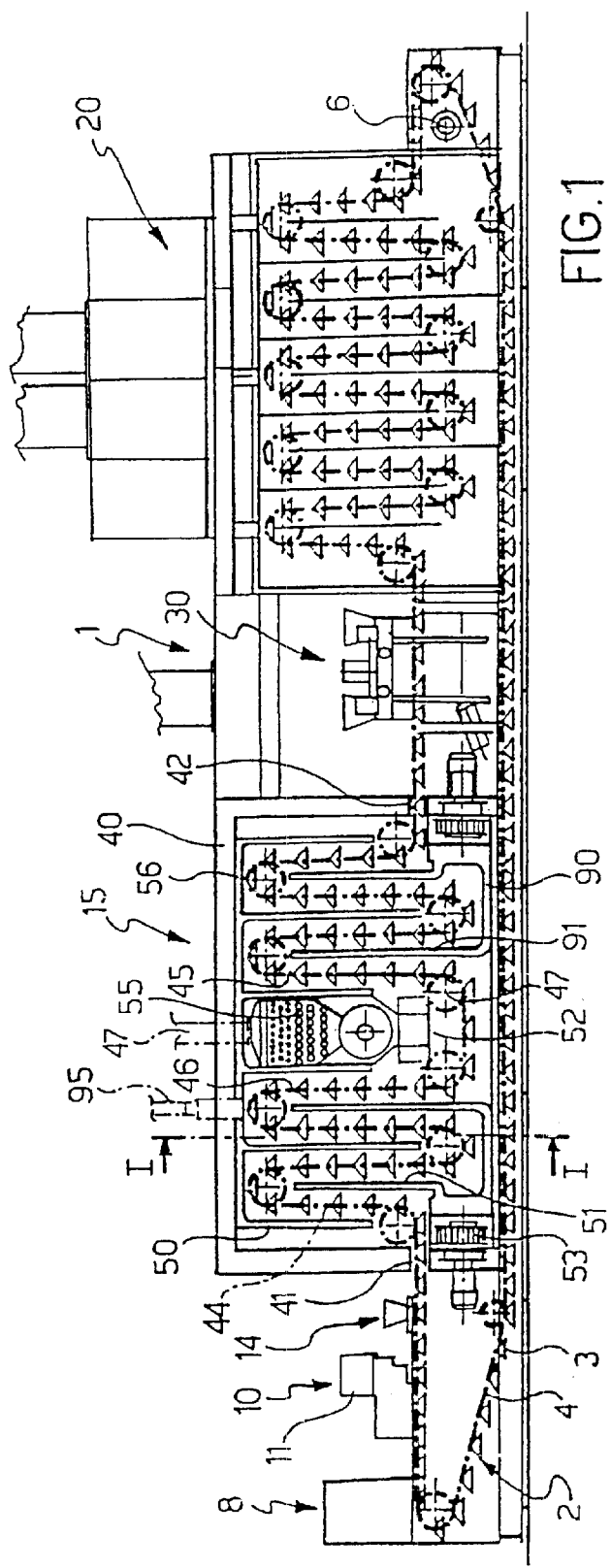
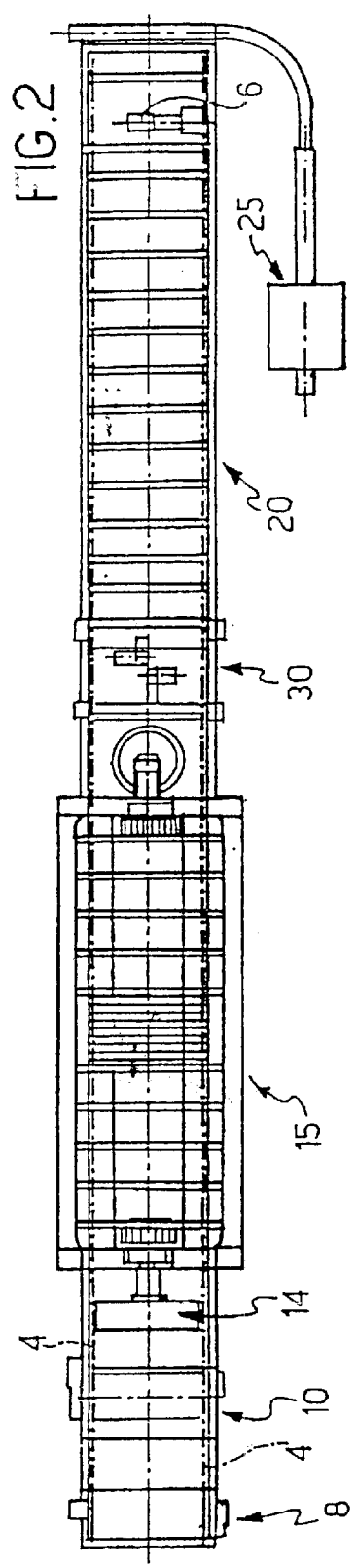
FIG.1
FIG.2

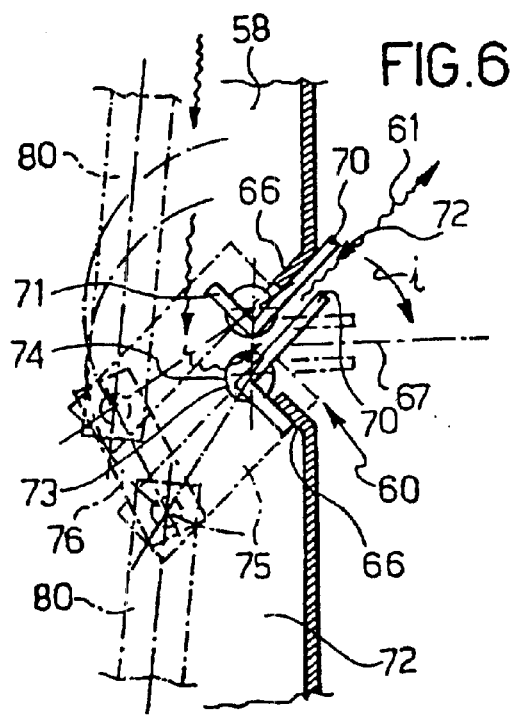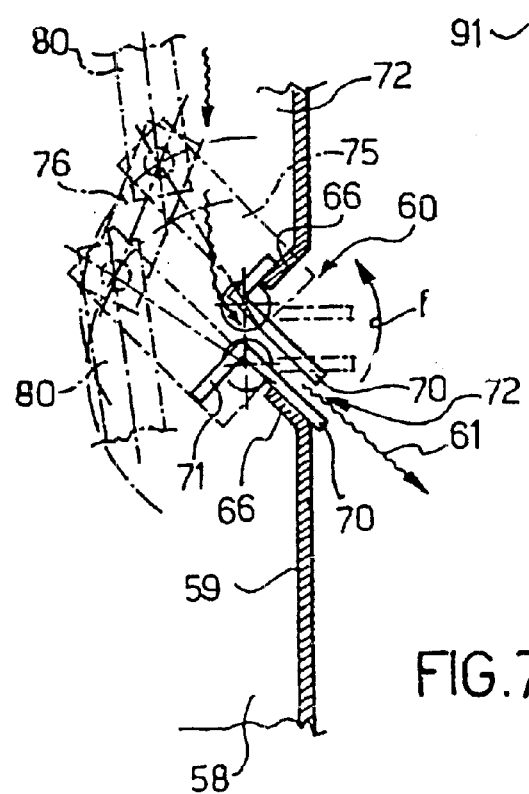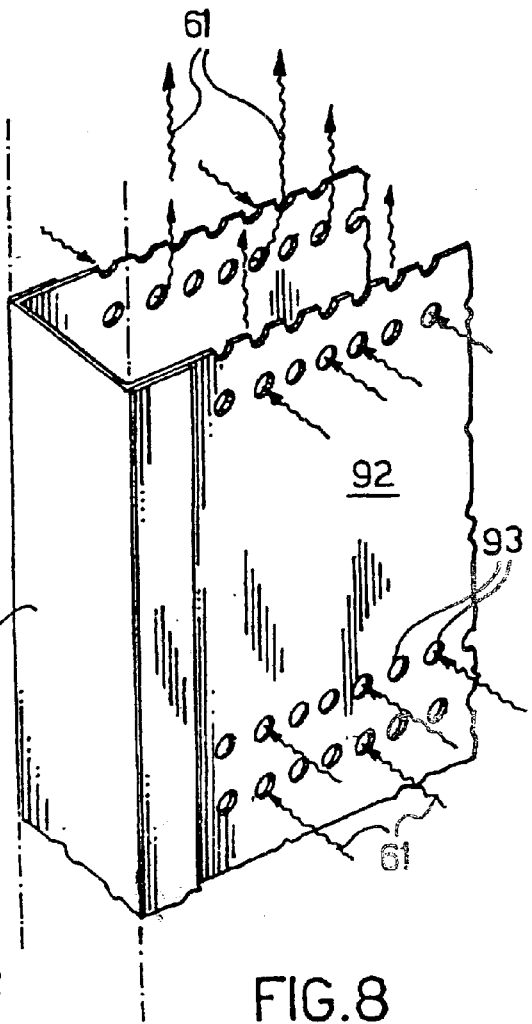

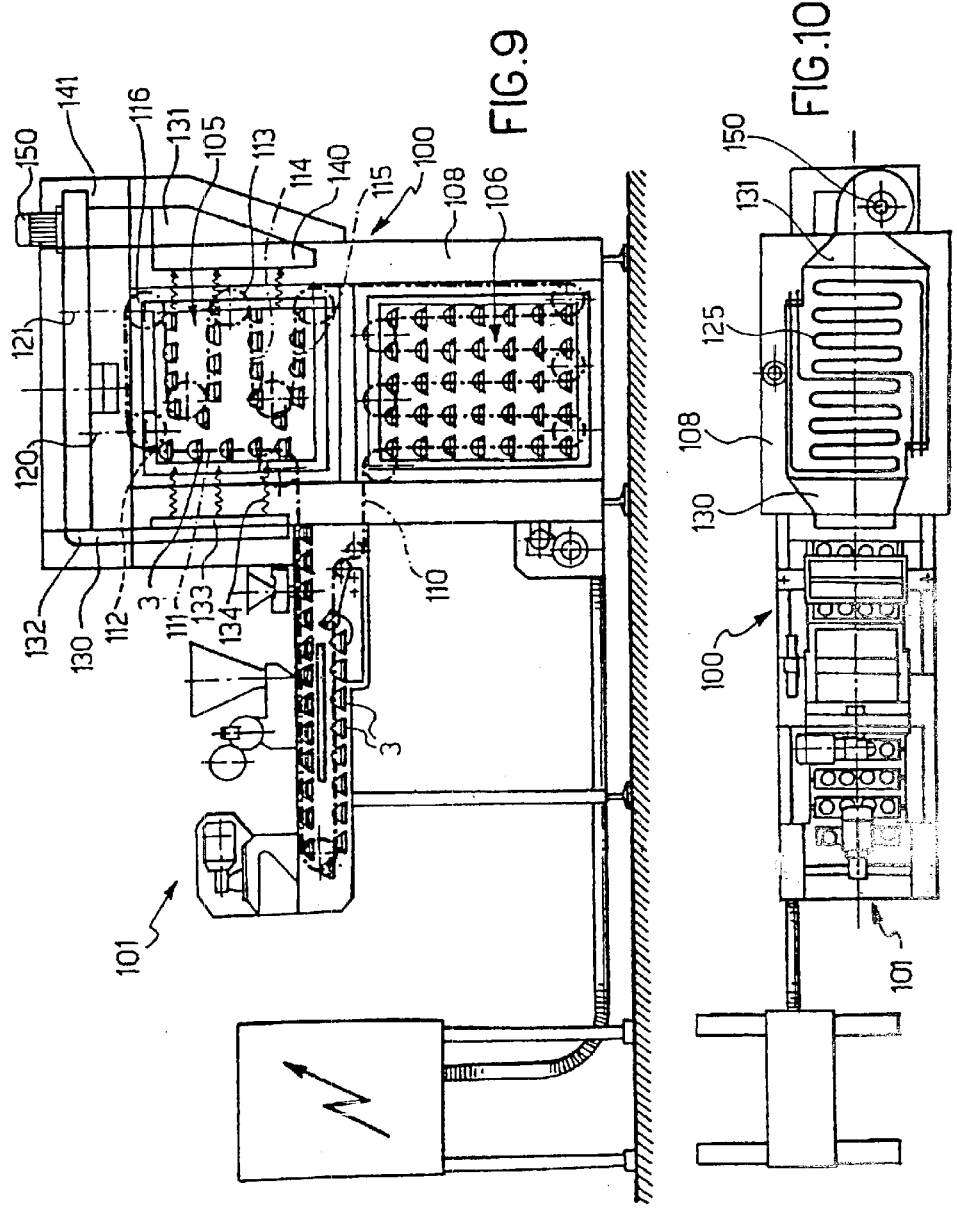

FACILITY FOR PREPARING BAKERY AND PASTRY PRODUCTS

SPECIFICATION

This invention relates to an installation for the preparation of bread and/or pastry products of the type which comprises, in sequence, a plurality of operating stations among which at least one is intended for the preparing and one for the baking of the products, and in addition a conveyor for carrying the products and moving them through the aforesaid plurality of operating stations.

The invention relates principally to installations with small dimensions for the preparation of bread and pastry products of various sizes and forms such as, for example those known internationally by the name of croissant, madeleines, sponge cakes, rolls, donuts and the like.

The installation further makes possible the preparation of the aforesaid products with a filling of jam, cream, chocolate and the like.

With the installation to which this invention refers, the products may be packed or arranged inside paper or plastic containers, in accordance with requirements.

The installation is of the type in which the aforesaid products may obtained starting from a dough prepared on the spot or else, preferably, from a dough prepared at source, frozen and later defrosted at room temperature prior to introduction thereof into the installation.

As is known, the preparation of the products indicated in the foregoing on an industrial scale requires appropriate machinery, the dimensions of which generally are substantial. Normally, the dough is disposed at the starting point of the installation and the final product is removed at the end of a production line which includes various processes, among which are baking and cooling. This latter process becomes particularly necessary if the product is not going to be consumed promptly, but rather is going-to be wrapped or packed.

Furthermore, the manufacturing of this type of product depends on the method of baking and cooling, and on the time taken for implementation thereof, which are specific to each type of product and which vary from product to product.

For example, the product known by the name of madeleines requires that its baking be started in correlation with the base, to be extended later to the upper part; this accordingly requires that, at the outset of the baking process, most of the heat be directed toward the base, while at the end it should be directed toward the upper part.

Moreover, the baking time for the part near the base is not the same as for the upper part.

Consequently, it may be concluded that the duration and intensity of the baking operation vary in terms of the product which is to be processed in the installation.

As a result of the operating requirement indicated above, the known technique provides for the preparation of the products in question in linear installations where the parameters and the method of baking and cooling may be fully controlled.

This nonetheless has the drawback that it requires machines with large dimensions and particularly long installations with the resulting need for large spaces for the setting up thereof.

Furthermore, given that the cooling time for an oven-baked product is approximately 1.5 times the baking time, when the installation also is to provide the cooling phase so that the product may be packed, the length of the production installation as a whole takes on really large linear dimensions.

The purpose of this invention is to resolve the problems associated with the installations for production of bread and pastry products indicated above, proposing an installation provided with the features of the known installations, but with reduced dimensions with the aim of affording the following additional advantages:

a) the possibility of transport of the component machines by means of motor vehicles or container vessels;

b) the possibility of setting up the installation in a reduced space, for example also in correlation with the points of sale of the products themselves, for example inside a bakery or pastry shop;

c) the possibility of preparing different types of products, whether bread or pastry, in the same installation, also simultaneously;

d) the possibility of preparing products of an industrial type as well as a small-scale type in the same installation, the products of a small-scale type being those which leave the installation and are sold directly and immediately to the consumer in the store, and those of an industrial type being the ones subjected to the cooling process so as to be packaged in containers made of paper or suitable synthetic material, for example polypropylene, for their preservation and subsequent sale.

The purposes have been achieved by means of an installation of the type specified in the foregoing, and it is characterized in accordance with claim 1 which is to follow.

The invention now will be described in greater detail, with reference to some preferred examples of embodiment illustrated in the attached drawings, in which:

FIG. 1 represents, in lateral section, an installation for the preparation of bread and pastry products in accordance with the invention;

FIG. 2 illustrates, in a view from above, the installation of FIG. 1;

FIGS. 6 and 7 represent, in lateral section, two different positionings of a hot-air flow injector;

FIG. 8 illustrates, in a partially sectioned axonometric view, hot-air exhaust means between the branches of the conveyor;

FIG. 9 shows, in lateral section, an installation for the preparation of bread and pastry products in accordance with a second form of embodiment of the invention, and FIGS. 10 and 11 show, in a lateral view from above, the installation of FIG. 9.

Figure 3:
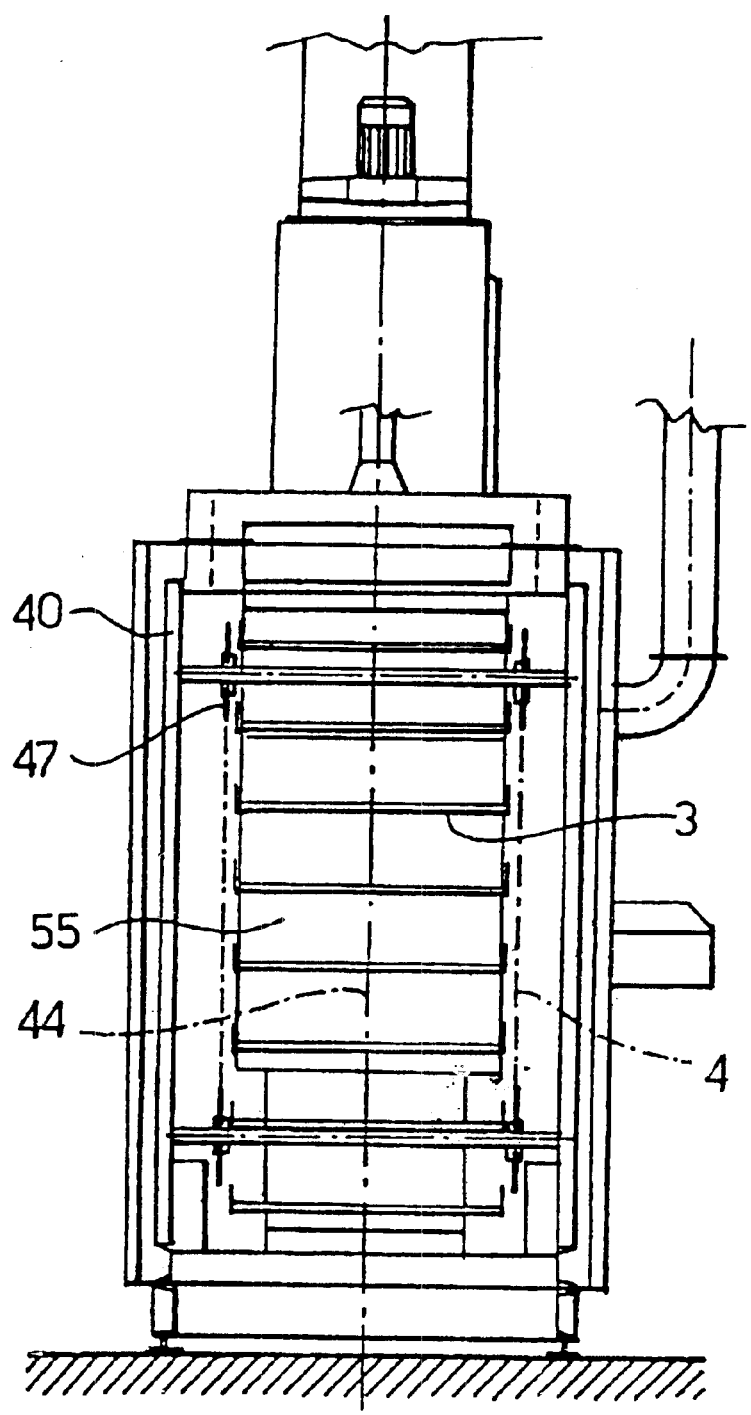
FIG. 3 illustrates the section along line I—I of the installation of FIG. 1.

With reference to the attached FIGS. 1, 2 and 3, an installation for the preparation of bread and/or pastry products has been indicated, as a whole, with 1.

The installation 1 comprises a plurality of operating stations disposed in sequence.

The operating stations are traversed by a conveyor 2 suitable for carrying the products to be baked during the procedure.

For example, the products to be baked are placed on a series of equidistant trays 3. The trays 3 are supported laterally, in freely swinging manner, by continuous conveyance chains 4, guided by support means known in themselves.

The tray 3 advantageously has in its upper portion a plurality of seats 5 suitable for receiving the containers for the products to be baked.

By means of a cogged wheel, the conveyor 2 is connected operatively to a moto-reducer 6 for the ongoing or, advantageously, intermittent movement of the product through the operating stations of the installation.

The conveyor 2 traverses a station or a series of stations for preparation of the product.

In the event that, for example, one intends to prepare pastry products, a first station 8 will be provided for the deposit of paper capsules or containers suitable for receiving a quantity of pastry dough to be baked.

The paper containers preferably have the form of a truncated cone and are held in seats 5 (FIG. 4) provided in the upper portion of the trays 3.

Following the station 8 for deposit of the containers, there is a second station 10 for deposit of the dough to be baked on the conveyor 2. In the case of paste for pastry, the aforesaid station 10 will be set up to dispense a suitable quantity of paste into the paper containers, or else, in the case of unbaked bread dough, the bread dough is placed directly on the tray 3.

If the dough to be baked has been prepared in advance and frozen, the station 10 for deposit of the product on the conveyor 2 provides positioning means, using a hopper 11, for the collection and conveyance of the dough, defrosted at room temperature.

A third operating station 14 accordingly provides the sugar or the garnishing elements to the deposit on the upper portion of the product to be baked.

Following stations 8, 10 and 14 for preparation of the dough and garnishing of the product to be baked, there has been provided a baking station 15, which will be described in greater detail hereinafter.

For the pastry products, following the baking station 15 there has been provided a cooling station 20, and also a packing station 25 (FIG. 2), known in itself.

The cooling station 20 advantageously is traversed by the conveyor disposed along a path which opens out into ascending and descending vertical branches, making it possible to obtain paths of considerable extent overall, and at the same time holding down the dimensions of the installation.

Disposed between baking station 15 and cooling station 20, or preferably following cooling station 20, it is possible to provide a filling station 30. This station 30 makes it possible to inject into the baked products, such as pastry products, creams, jams, chocolate and the like.

With the aid of FIGS. 1 and 4, baking station 15 is going to be described in greater detail below.

Station 15 for baking of the products advantageously consists of a hot-air oven.

The oven 15 is inside a container structure 40, preferably self-supporting and transportable.

The aforesaid structure 40 has an inlet opening 41 and an outlet opening 42 for the passing of the conveyor 2 starting from the stations for preparation of the product to be baked, and directed to the possible cooling station 20.

The conveyor 2 is disposed between the inlet 41 and the outlet 42, along a path 44 which opens out into ascending vertical branches 45 and descending vertical branches 46.

For example, continuous support chain 4 for the trays 3 is guided by two series of return pulleys or cogged wheels 47 connected in freely turning manner in the vicinity of the upper and lower portion of the container structure 40 for the oven 15.

Each of the branches 45 and 46 of the path 44 is flanked, along one part, by hot-air introduction means 50 and, along the other part, opposite the first, by exhaust means 51.

Subordinated to hot-air introduction means 50 and exhaust means 51, there have been provided pumping mechanisms 52 to send the hot air to the aforesaid introduction means 50, and pumping mechanisms 53 to evacuate and place in recirculation the air withdrawn from the aforesaid exhaust means 51.

In an advantageous form of embodiment of the invention, a heat source, known in itself, has been provided integral with the container structure 40 for the oven 15.

The aforesaid source is encapsulated in order to prevent mixing of the combusted gases exiting from the oven 15 by means of a passage 47 provided for the purpose, with the hot air useful for baking of the food.

From the heat source, by means of a heat exchanger 55 of the air-air type, the heat is given over to a flow of air circulating though the interior of the baking space formed in the self-supporting container structure 40, in the manner which is described below.

The hot-air flow ducts 56 start from the heat exchanger 55.

For example, the aforesaid ducts 56 are supported at the top by the container structure 40 for the oven 15.

From the upper portion of the oven 15, the aforesaid ducts 56 branch out in the manner of a comb toward the lower portion, becoming positioned at the sides of the vertical branches 45 and 46 of the path 44 of the conveyor 2.

Figure 4:
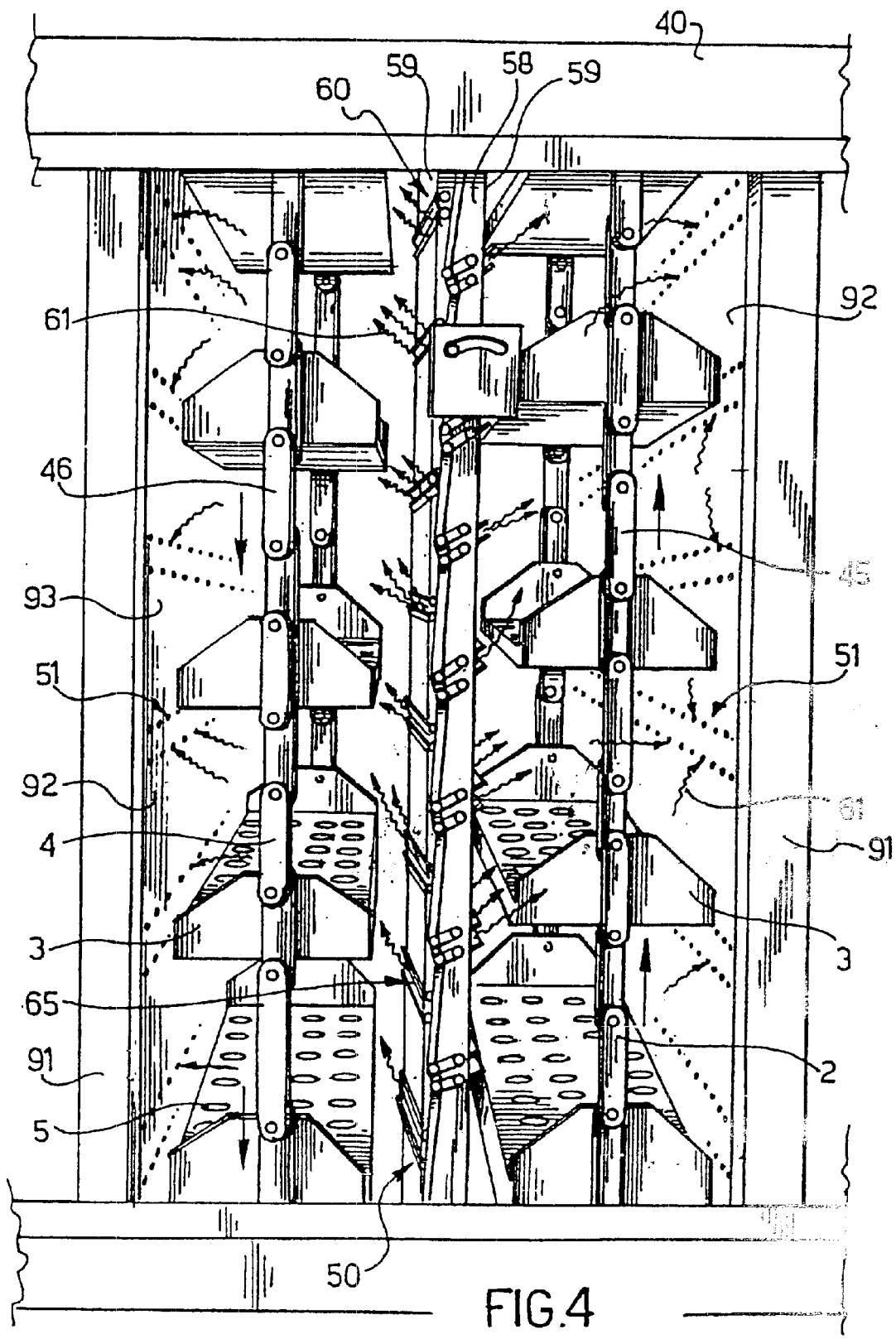
FIG. 4 represents a detail of the oven, in a partially sectioned axonometric view, with two branches of the conveyor flanked by hot-air introduction and exhaust means.
Figure 5:
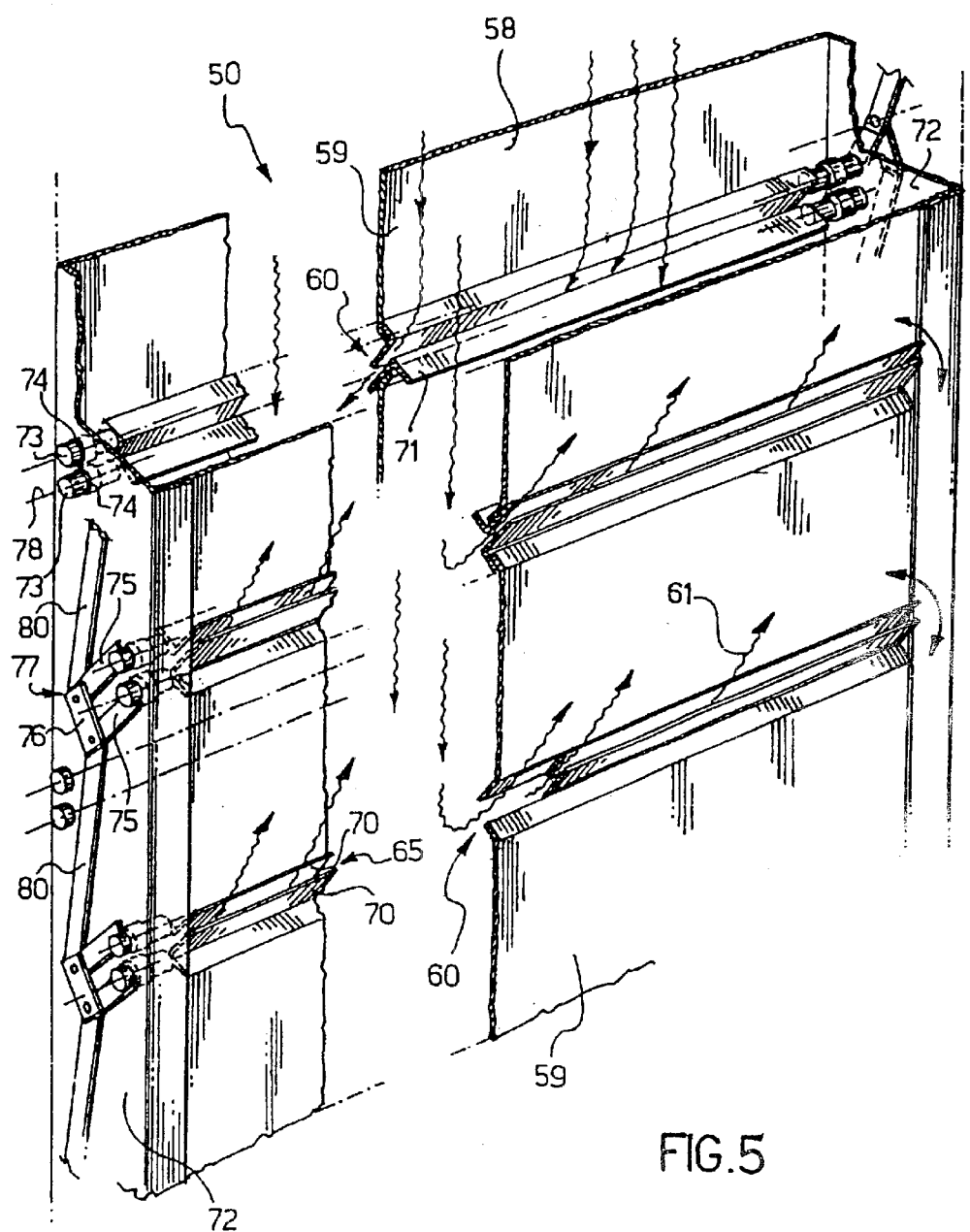
FIG. 5 illustrates, in a partially sectioned axonometric view, a detail of the hot-air introduction means.

In particular, as may be gathered from FIGS. 4 and 5, the hot-air flow ducts 56 are joined with the panels 58 in the form of concave sheets.

The aforesaid concave panels 58 have on the walls 59, opposite one another and facing the conveyor 2, a series of openings 60. These openings 60 are disposed transversely with respect to the conveyor 2, and in general extend for the entire width of the conveyor 2.

The openings 60 preferably are distributed uniformly along the height of the panel 58.

From the openings 60, the hot air driven from the pumping mechanisms 52 exits in the form of a hot-air flow 61 which surrounds the trays 3 of the conveyor 2 along a horizontal axis.

The openings 60 advantageously are provided with injectors 65 which may be adjusted between a position for generation of a hot-air flow 61 with horizontal axis 66, and positions in which such axis is inclined at a positive or negative angle with respect to the horizontal plane.

As a particular advantage, the injectors 65 may be positioned in an adjustable manner in order to direct the hot-air flow 61 according to preestablished directions.

In a special form of embodiment of the invention, as may be gathered from FIGS. 6 and 7, the transverse edges 66 of the openings 60 are bent inward in a V.

The sides 70 of a pair of sheets 71 with an L-shaped cross section placed opposite one another are received in the opening 60.

The sheets 71 form with the facing sides 70 a guide slit 72 for the hot-air flow 61 which exits from the panel 58.

The sheets 71 are joined at the end to the side walls 72 of the panel 58. For example, bolts 73 received in opening passages 74 provided in the side walls 72 of the panel 58 extend from the ends of the sheets 71.

The sheets 71 are joined to the panel 58 in such manner that the angle edge of the L-shaped section is disposed in the vicinity of the free end of the edge 66 bent in a V.

The free end of the bolt 73 which projects from the side wall 74 has been fastened to a rocker cam 75.

A sheet 76 is joined to the free end of contiguous cams 75, forming therewith a linked quadrilateral 77.

The sheets 71, opposite and received in the same opening 60, on being joined together by means of the quadrilateral 77, swing around the axis 78 of the connecting bolts 73, keeping the sides 70 parallel to one another.

When the quadrilateral 77 swings (according to arrow i or f), it is possible to change the direction of the hot-air flow 61 which strikes the trays 3, without changing the section of the slit 72, and therefore without changing the hot air capacity.

A series of activator rods 80 join together in linked manner the quadrilaterals 77 of the sheets 71 disposed on the same side of the panel 58.

As an additional advantage, one of the activator rods 80 is joined operatively to a control cam which may be activated manually.

The control cam preferably is joined operatively to a linear actuator regulated in controlled manner.

Preferably, the linear actuator is joined operatively to a control device put in place for the adjustment and regulation of the activating means present in the various stations 8, 10, 14, 15, 20, 25 and 30, and for the adjustment of activating means 6 of the conveyor 2.

Again referring to FIGS. 1 and 4, there can be seen in the upper portion of the space of oven 15, an exhaust conduit 90 set in the vicinity of the base of the self-supporting container structure 40.

The exhaust conduit 90 is joined to the panels 91 in the form of concave sheets.

The aforesaid exhaust panels 91 are disposed vertically, facing the branches 45 and 46 of the path 44 of the conveyor 2, so that they will be positioned opposite the hot-air introduction means 50.

The walls 92 of the exhaust panels 91 which face the conveyor 2 in general extend for the entire width and for the height of the branches 45 and 46 of the conveyor 2.

As can be seen from FIG. 8, the aforesaid walls 92 have a plurality of opening passages 93.

Advantageously, rows of opening passages 93 have been provided extended for the full width of the panel 91 and equally spaced along the entire height of the panel 91.

The pumping mechanisms 53, subordinated to the exhaust means 51, ensure a sufficient negative-pressure effect so that it exhausts the air flow 61 which has passed across the trays 3 of the conveyor 2.

The air exhausted from the panels 91 is directed to the conduit 90 and, except for a fraction purged and expelled from the oven by means of a channel 95 (FIG. 1), the exhausted air is directed toward the heat exchanger 55 to be reheated and sent back in recirculation.

The functioning of the invention is going to be described below.

The dough, whether prepared on the spot or fed to the installation after having been defrosted, is dispensed onto the trays or into the paper containers disposed on the trays, from deposit station 10.

After garnishing, the product to be baked enters the oven 15.

Owing to the fact that the path of the conveyor 2 opens out into ascending and descending branches, the product remains in the oven for sufficient time for a homogeneous baking and, if such is the case, for a time useful for a differentiated baking of the base and the upper portion of the product (as, for example, in the event that one wishes to prepare madeleines).

This advantageous preparation is obtained by directing the hot-air introduction injectors 65.

In particular, one proceeds by moving the conveyor 2 forward, so that the trays 3 are positioned between the injectors 65. With the trays 3 disposed between the injectors 65, it is possible to direct the hot-air flow 61 horizontally in order to obtain a uniform baking (for example, for the baking of bread). Alternatively, it is possible to direct the flow 61 toward the low portion, to bake mainly the upper part of the product, or else to direct the flow 61 toward the high portion so that it strikes the tray on the low part, to bake mainly the base of the product.

As a particular advantage, it will be possible, for example, to direct upward (positive or negative angle of axis of flow 61 with respect to the horizontal) the injectors 65 of the panels 58 located on the side pieces of the initial branches 45, 46, of the path 44 of the conveyor 2 inside the oven 15. Then, to direct the injectors 65 of the panels 58 located at the sides of the central and end portion of the path 44, in order to generate a flow 61 with a horizontal axis and inclined downward, respectively.

After baking, it is possible to remove the product from the trays 3 to be sold immediately to the consumer (for example, in an installation producing bread).

Otherwise, the product is left on the conveyor 2 which traverses cooling station 20.

Owing to the fact that the path through the cooling station opens out into ascending and descending branches, the product remains in the station for a sufficient time for its gradual cooling to room temperature, avoiding drawbacks such as the loss of firmness of the product.

The cool product therefore can be packed, for example in wrappers of polypropylene or another synthetic material for foods, and be packaged.

The principal advantages of the invention are recognizable by the fact that:

a) owing to the ascending and descending coiled path of the conveyor, provided in the oven and the refrigerator, and to the provision of panels for the introduction and exhaust of the air in the vicinity of the trays, the total length or dimensions of the installation are reduced considerably, while retaining an optimal preparation;

b) reduced dimensions of the installation and the provision of stations, such as mainly the oven, which have a support structure of the self-supporting type, enable the installation to be transported easily and quickly;

c) the installation consisting of a multiplicity of operating stations is, furthermore, modular; owing also to the reduced dimensions and the ease of transport, the installation likewise is simple to install in environments of limited size, such as, for example, in shops selling bread and pastry to the consumer;

d) owing to the provision of a conveyor path of limited dimensions, but of sufficient total length, and the possibility of directing the flow of hot air, the type of baking may be made to vary in terms of the product; this flexibility in the installation also allows for a simultaneous production of bread and pastry products;

e) in addition, the proposed installation makes it possible to remove the product immediately after the baking phase, for example for immediate sale to the consumer (small-scale production), or else to remove the product following the cooling and packaging phase, for an industrial-type preparation.

Figure 11:
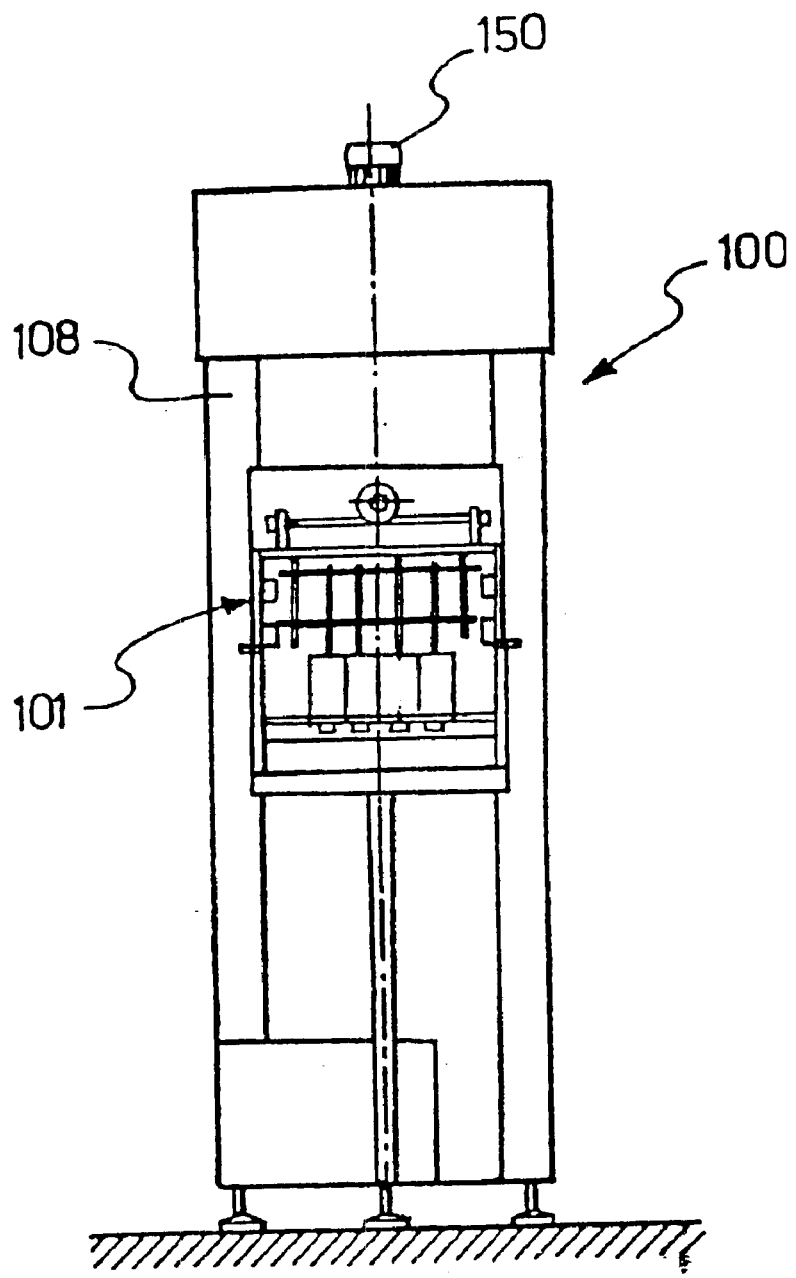

In FIGS. 9, 10 and 11 there may be seen an additional advantageous form of embodiment of an installation 100 for the preparation of bread and pastry products.

Following stations 101 for preparation of the product to be baked, a baking station 105 has been disposed above a successive cooling station 106.

In particular, there has been provided a sole self-supporting container structure 108 which has an upper space in which there is disposed the baking station 105, for example a hot-air oven, and a lower space, adequately insulated from the upper space, in which the cooling station 106 has been set up.

Installation 100, therefore, derives from further reduced dimensions, and thus is very easy to transport, in addition to being also easy to set up in environments of limited size, such as bread or pastry shops.

The proposed installation 100, despite its reduced dimensions, proves to be extremely versatile and suitable for the preparation of products which require different methods of baking, such as bread and pastry products.

In fact, the installation 100 is traversed by a continuous conveyor 110, capable of carrying the products and moving them through the plurality of operating stations 101, 105 and 106.

Inside oven 105, the aforesaid conveyor 110 advantageously moves along a path 111 which opens out into an ascending branch 112 and a descending branch, indicated as a whole by 113.

In order to lengthen the path 111, the aforesaid descending branch 113 has subsequent horizontal branchings 114.

For example, the aforesaid horizontal branchings 114 are obtained by arranging the passage of the conveyor 110 along a descending coiled path 115 disposed between two series of return pulleys or cogged wheels 116, disposed in aligned manner on vertical planes 120 and 121, parallel to one another.

In the upper portion of the space in self-supporting structure 108, a heat generator operatively connected to a heat exchanger 125 of the air-air type has been provided (FIG. 10).

From the heat exchanger 125 there extend laterally, flanking branches 112 and 113 on the outside, hot-air introduction means 130 and in opposite position, air-exhaust means 131.

In particular, a collector conduit 132 connects the heat exchanger 125 with a first panel 133 in the form of a concave sheet, disposed vertically, facing ascending branch 112.

The aforesaid panel 133 has a series of transverse openings for the introduction of hot-air flows 134 in correspondence with the trays 3 of conveyor 110.

The injectors advantageously are received in the openings. The aforesaid injectors may be directed in a controlled manner, in order to position the direction of air flow along an inclined axis with a positive or negative angle with respect to a horizontal plane (in a manner similar to the injectors in FIGS. 6 and 7). In this way, it becomes possible to direct the flow of hot air onto the tray 3 of conveyor 110 so that the tray is traversed by the air flow 134 from the lower portion toward the higher portion, or vice versa.

Disposed opposite the panel 133 and positioned flanking descending branch 113 on the outside, a second vertical panel 140 in the form of a concave sheet has been provided.

The aforesaid panel 140 has, on the wall turned toward the conveyor 110, a plurality of opening passages through which the air which has traversed branches 112 and 113 of conveyor 110 is exhausted.

The aforesaid exhaust panel 140 is connected to a conduit 141 for channeling the exhausted air toward the heat exchanger 125.

Subordinated to conduit 132 for distribution and introduction of hot air and conduct 141 for channeling of the exhausted air, pumping mechanisms 150 have been provided.

What is claimed is:

1. An installation for preparation of bread and/or pastry products, comprising, in sequence, a plurality of operating stations including at least one for preparing and one for baking of the products, in addition to a conveyor to carry the products and move them through the plurality of operating stations, wherein the baking station for the products includes a hot-air oven inside of which the conveyor moves along a path which opens out into ascending and descending vertical branches, each branch of the path being flanked along a first part by hot-air introduction means and along a second part, opposite the first part, by exhaust means.

2. An installation in accordance with claim 1, wherein following the baking station, a cooling station for the products is provided.

3. An installation in accordance with claim 1, wherein the hot-air introduction means and the exhaust means are distributed along a vertical extension of each ascending and descending branch.

4. An installation in accordance with claim 1, wherein the hot-air introduction means includes openings which generate a respective hot-air flow with a horizontal axis.

5. An installation in accordance with claim 1, wherein the hot-air introduction means includes injectors which may be adjusted between a position for generation of a flow with a horizontal axis, and positions in which such horizontal axis is inclined at a positive or negative angle with respect to a horizontal plane.

6. An installation in accordance with claim 1, wherein the hot-air introduction means and the exhaust means are borne by respective panels in a form of concave sheets, an inner cavity of which serves as a collector for the air which is heated and exhausted respectively.

7. An installation in accordance with claim 1, wherein the hot-air oven is configured to be implemented as a self-supporting transportable structure, which includes means for heating of the air for baking of the products, pumping mechanisms for sending the hot air to the introduction means, pumping mechanisms for evacuating the air withdrawn from the exhaust means, and mechanical means for supporting and moving the conveyor for the products.

* * * * *